United States Patent [19]

Abe

[11] E Patent Number: Re. 32,799

[45] Reissued Date of Patent: Dec. 13, 1988

[54] COIN COUNTING AND DISPENSING APPARATUS

[75] Inventor: Hiroshi Abe, Tokyo, Japan

[73] Assignee: Asahi Seiko Kabushiki Kaisha, Tokyo, Japan

[21] Appl. No.: 841,601

[22] Filed: Mar. 20, 1986

Related U.S. Patent Documents

Reissue of:

[64] Patent No.: 4,437,478
Issued: Mar. 20, 1984
Appl. No.: 279,426
Filed: Jul. 1, 1981

[30] Foreign Application Priority Data

Jul. 8, 1980 [JP] Japan ..... 55-92280

[51] Int. Cl.[4] ..... G07D 5/02; G07D 9/04

[52] U.S. Cl. ..... 453/32; 194/337; 221/182; 453/57

[58] Field of Search ..... 133/8 R, 8 A, 8 B, 5 R, 133/5 A, 3 A; 221/167, 182, 7; 194/243, 337; 453/33, 34, 57, 32

[56] References Cited

U.S. PATENT DOCUMENTS

| | | | |
|---|---|---|---|
| 2,886,045 | 5/1959 | Brown et al. . | |
| 3,147,839 | 9/1964 | White | 194/317 |
| 3,147,839 | 9/1964 | White, Jr. . | |
| 3,273,571 | 9/1966 | Seiden . | |
| 3,326,223 | 6/1967 | Ochi . | |
| 3,368,713 | 2/1968 | Hurst et al. . | |
| 3,680,566 | 8/1972 | Tanaka et al. . | |
| 3,902,511 | 9/1975 | Jacobs . | |
| 3,942,544 | 3/1976 | Breitenstein et al. | 133/4 R |
| 4,111,332 | 9/1978 | Hurst et al. | 221/7 |

FOREIGN PATENT DOCUMENTS

| | | |
|---|---|---|
| 2614560 | 10/1977 | Fed. Rep. of Germany . |
| 2415843 | 1/1979 | France . |
| 43-28884 | 11/1968 | Japan . |
| 60-9899 | 4/1985 | Japan . |
| 603663 | 6/1948 | United Kingdom . |
| 1117279 | 6/1968 | United Kingdom . |
| 1254562 | 6/1969 | United Kingdom . |
| 1190732 | 5/1970 | United Kingdom . |
| 1456154 | 11/1976 | United Kingdom . |

*Primary Examiner*—F. J. Bartuska
*Attorney, Agent, or Firm*—Parkhurst & Oliff

[57] ABSTRACT

A coin dispensing apparatus is disclosed having a hopper for storing coins, a rotary disc rotatably mounted within said hopper at an angle to the horizontal, a plurality of delivery pins spaced in the peripheral direction on said rotary disc, a delivery knife for guiding coins at the upper delivery portion to a discharge chute and a counter at the upper delivery portion. The rotary disc is rotatably supported on a supporting plate by means of a plurality of balls interposed between the bottom surface of the rotary disc and the upper surface of the supporting plate and the rotary disc is urged toward the supporting plate so as to obtain effective engagement therebetween through the balls. The counter has a removable and replaceable counter roller rotatably mounted on a rocker arm having an actuating arm adapted for moving into a slot between a pair of sensor coils of an electromagnetic sensor such as a proximity switch or a slot switch. The counter roller is normally positioned in the delivery passage opposite the delivery knife and urged towards the latter by means of spring so that when a coin is delivered to the delivery passage along the delivery knife, the rocker arm is pivoted by the coin so as to move the actuating arm into the slot of the sensor to make switching action. The counter roller is removable and replaceable with different diameter counter rollers to accommodate varying denominations of coins.

6 Claims, 3 Drawing Sheets

COIN COUNTING AND DISPENSING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus for dispensing coins or tokens, and more particularly to a hopper type coin dispensing apparatus including a hopper for storing coins or tokens in bulk and a rotary disc for delivering the coins from the hopper one at a time and in specific quantities.

2. Description of the Prior Art

U.S. Pat. No. 3,942,544 is illustrative of the prior art. There is disclosed a coin dispensing apparatus for various coin denominations including a hopper for storing coins, a rotary disc rotatably disposed in the hopper at an angle to the horizontal, a removably secured central disc on the rotary disc and a delivery knife. The central disc is removable and replaceable with different diameter central discs to accommodate varying denominations of coins and the delivery knife is pivotably mounted to accommodate varying diameters of varying coin denominations. The rotary disc is provided with a plurality of pins extruded from the front surface thereof in positions spaced in the peripheral direction. The central disc and the extruded pins define coin receiving spaces. These coin receiving spaces pick up coins from a gutter formed in the lower portion of the hopper and deliver them to the upper delivery portion one at a time and in specific quantities when the rotary disc is rotated within the hopper. The coins delivered into the upper delivery portion are guided by the delivery knife to a coin discharge chute. The coins passing the upper delivery portion are usually counted by means of a coin counter which has an actuator or an actuation roller of a microswitch resiliently projected into a position to be engaged with the coins effectively. Alternatively the coin counter comprises a photoelectric switch adapted for detecting the coin pushed out by a leaf spring extending from one side of the delivery passage.

However, such a conventional coin counter has a disadvantage that the extended position of the actuator or the actuating roller of the microswitch or the leaf spring is substantially fixed or limited even if it is adjustable so that when the diameter of the coin to be dispensed is substantially changed, it is necessary to replace the central disc with another having a different diameter and also to adjust the position of the delivery knife to accommodate varying diameters of the coins. Accordingly, it is necessary to prepare a lot of central discs having varying diameters as well as to adjust with a high degree skill.

SUMMARY OF THE INVENTION

In view of the foregoing it is a principal object of the present invention to provide a coin dispensing apparatus for various coin denominations which by replacement of a relatively inexpensive counter roller can be converted for a wide variety of coin diameters without any adjustment.

Another object of the present invention is to provide a coin dispensing apparatus without an eccentricity or runout of the rotary disc.

A feature of the present invention is a coin dispensing apparatus comprising a removable and replaceable counter roller rotatably mounted on a rocker arm integrally formed with an actuating arm of a proximity switch and normally positioned in the delivery passage opposite the delivery knife and biased towards the latter, said rocker arm and actuating arm being so formed that as a coin having a predetermined diameter passes the delivery passage along the delivery knife, the rocker arm is pivoted by the coin and causes the actuating arm to move into the detecting space of the proximity switch.

The proximity switch comprises a pair of spaced-apart sensor coils which, between them, define a slot which opens in a pair of opposite directions and into and out of which the actuating arm moves unrestrictedly in said directions; and therefore when a coin of larger diameter passes between the delivery knife and the counter roller, it merely causes the actuating arm to swing farther through said slot than would be the case with a coin of said predetermined diameter, so that the larger diameter coin will not jam the apparatus.

DESCRIPTION OF DRAWINGS

Further objects and advantages of the present invention will become apparent as the following description of an illustrative embodiment proceeds with reference to the drawings in which.

DESCRIPTION OF THE PREFERRED EMBODIMENTS

Figure 1:
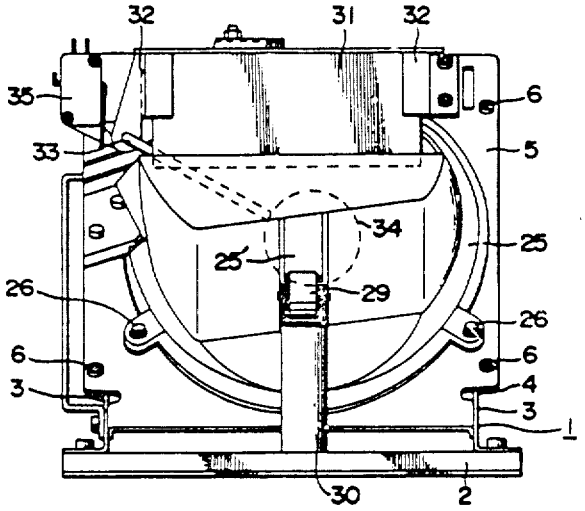
FIG. 1 is a front elevation of the coin dispensing apparatus according to the present invention.
Figure 2:
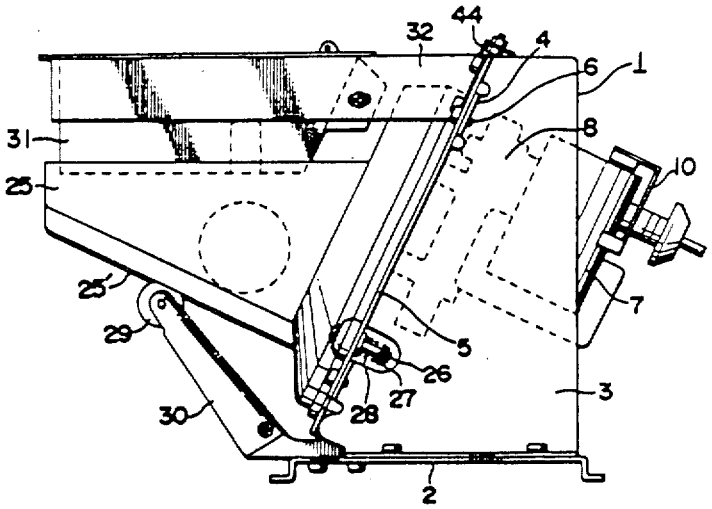
FIG. 2 is a side elevation of the coin dispensing apparatus shown in FIG. 1.

With reference to drawings, it will be seen that a mounting frame 1 is composed of a base plate 2 and side plates 3, 3 having flanges 4, 4 on their respective inclined front edges. One the mounting frame 1, a rotary disc supporting plate 5 is fixedly mounted by means of bolts 6, 6 secured to the flanges 4, 4, so that the supporting plate 5 is at an angle to the horizontal and a motor 7 is mounted on the supporting plate 5 for driving a drive shaft 9 through a reduction gear box 8. The motor 7 is provided with a conventional braking mechanism 10 for stopping at a desired angular position.

In order to rotatably support a rotary disc 13 on the inclined supporting plate 5, a plurality of balls 11 are interposed between the upper or front surface of the supporting plate 5 and the bottom surface of the rotary disc 13. The balls 11 are rotatably confined in retainers 12, respectively, which are spaced in the peripheral direction and fixed to the front surface of the supporting plate 5. The rotary disc 13 has a concentric circular race 14 formed on the bottom surface thereof for engaging the balls 11 in the retainers 12.

The rotary disc 13 has also an eccentric driven pin 15 extruded from the bottom surface thereof for engagement by a radially projecting drive pin 16 secured to the drive shaft 9. When the motor is operative and rotates the drive shaft 9 the rotary disc 13 is connected operatively to the drive shaft 9 by the drive pin 16 in its engagement with the driven pin 15. The rotary disc 13 has a plurality of delivery pins 17 extruded from the front surface thereof in positions spaced in the peripheral direction. The delivery pins 17 may be formed by means of a stamping operation performed on the rotary disc.

Concentrically overlying the top surface of the rotary disc 13 is also provided with a central disc 18. The central disc has a central opening 19 for receiving the drive shaft 9 which also extends through the center of the rotary disc 13. A plurality of agitators 20 that protrude from the front surface of the central disc 18 may also be formed by a stamping operation.

In order to prevent eccentricity and runout of the rotary disc 13 as the result of unbalance from the weight of coins engaging it, it is biased downwardly, as by means of a belleville spring 21, to engage its circular race 14 with the balls 11 on the supporting plate 5 under a desired pressure. The belleville spring 21 is secured to the upwardly projecting end of the drive shaft 9 through a washer 22, by means of a screw 23, and it also urges the central disc 18 against the rotary disc 13.

The hopper 25 is made of plastics and is resiliently mounted on the supporting plate 5 by means of pins 26, each of which extends through a hole (not shown) in the supporting plate 5. A spring 28 interposed between the bottom side of the supporting plate 5 and a collar 27 secured to the extended end portion of the pin 26 permits the hopper 25 to lift itself away from the supporting plate resiliently, against the force of the spring. Such lifting movement of the hopper 25 relative to the supporting plate 5 prevents coins contained within the hopper 25 from jamming in the gutter portion of the hopper. The hopper 25 is also movably supported by means of supporting roller 29 which is mounted rotatably on a stationary supporting arm 30 and engaged with the guide portion 25' of the hopper 25.

In order to increase the amount of coins to be stored in the coin dispensing apparatus, an additional hopper 31 is removably mounted on brackets 32 that project from the upper portion of the mounting frame 1 above the hopper 25. Also, in order to detect the amount of coins contained in the hopper, a detector arm 33 is pivoted to the bracket 32 and has a detecting element 34 secured to its free end that makes contact with the coins within the hopper. The detecting arm 33 is further arranged to actuate a detecting microswitch 35 when the amount of the coins attains an upper or lower limit level.

The coin dispensing apparatus includes a delivery knife 40 adapted for guiding coins to a coin discharge chute at the upper delivery portion 41 and further a removable and replaceable counter roller 42 adapted for the diameter of the coins to be dispensed so as to define a delivery passage 43 in cooperation with the knife 40.

Figure 3:
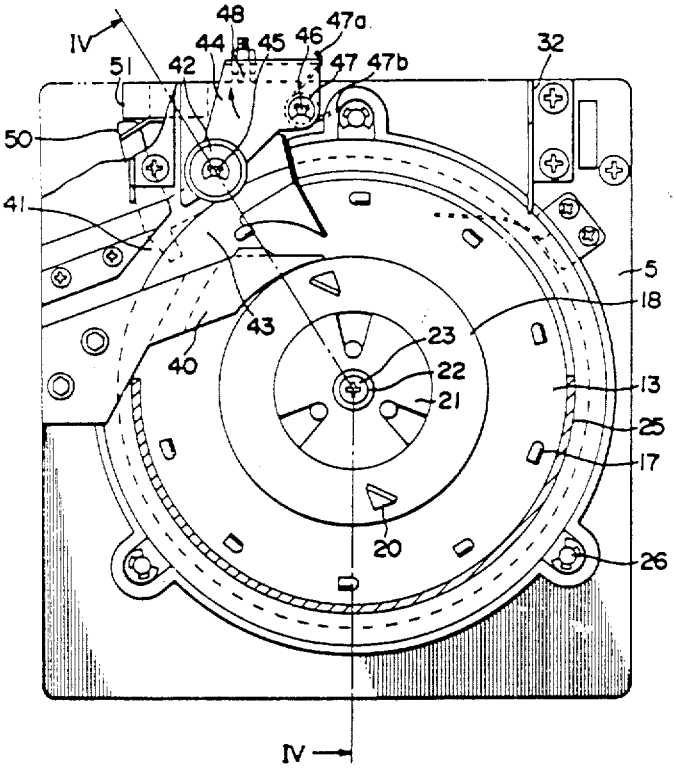
FIG. 3 is a front elevation on a larger scale of the coin dispensing apparatus with the hopper removed to show the rotary disc and the counting means.
Figure 4:
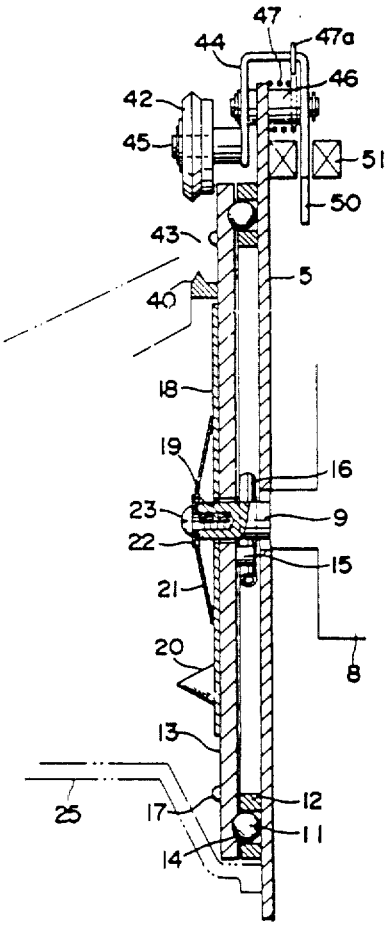
FIG. 4 is an enlarged sectional view illustrating the relationship between the drive gear box, drive pin, rotary disc and rotary disc supporting means.
Figure 5:
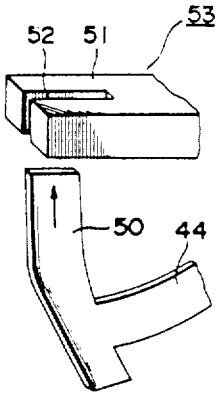
FIG. 5 is an illustrative perspective view of a portion of the proximity switch.

The counter roller 42 is rotatably and removably mounted on a pin 45 at the free end of a rocker arm 44 by means of a split ring. The rocker arm is pivoted to the supporting plate 5 by means of a pin 46 and is normally urged to the position shown in FIG. 3 by means of a spring 47. The one end 47a of the spring 47 is engaged with the rocker arm 44 and the other end 47b is engaged with the supporting plate 5 so as to pivot the rocker arm 44 in a counterclockwise direction until a stopper 48 adjustably secured to the rocker arm 44 engages the upper edge of the supporting plate 5. The stopper 48 determines a position of the counter roller 42 at the one side of the delivery passage 43 that enables it to be actuated by a coin having a predetermined diameter. As such a coin is delivered to the delivery passage 43 along the knife 40, by pushing action of a pin 17 on the rotating disc 13, the coin effectively contacts the counter roller 42 to pivot the rocker arm 44 in a clockwise direction against the force of the spring 47. The pivotal movement of the rocker arm 44 causes a switch actuating arm 50 formed integrally with the rocker arm 44 to move into a gap or slot 52 between a pair of sensor coils 51, 51 of an electromagnetic sensor such as a slot switch or a proximity switch 53 to make switching action for counting each coin that passes the counter roller.

It will be seen from the above that in the coin dispensing apparatus according to the present invention a plurality of balls interposed between the bottom surface of the rotary disc and the upper surface of the supporting plate rotatably supports the rotary disc on the supporting plate, and means for urging the rotary disc toward the supporting plate prevents the rotary disc from disengaging the balls, thus overcoming the problem of lift and runout of the rotary disc with a simple and low cost construction. Furthermore, the removable and replaceable counter roller, rotatably mounted on the rocker arm, can be readily replaced by a different counter roller, to accommodate coins of a different diameter, without necessity for replacement of the center disc or adjustment of the position of the delivery knife. Finally, delicate adjustment of the counter switch is unnecessary because the actuating arm of the electromagnetic sensor which is formed integrally with the rocker arm that carries the counter roller, can move freely into the detecting gap or slot between a pair of sensor coils of the electromagnetic sensor so that a coin having larger diameter than the predetermined diameter may pass through the delivery passage without any jams.

What is claimed is:

1. A coin dispensing apparatus comprising a hopper for holding a supply of coins, a rotary disc in said hopper that is inclined to the horizontal and has coin engaging means on an upper face thereof, said rotary disc being rotatable in one direction to carry coins upward from near the bottom of the hopper, a delivery knife near the top of the disc to which coins are delivered by the rotary disc for guidance to a delivery chute and which has a substantially upwardly facing surface that the coins engage edgewise, a counter roller having a periphery edgewise engageable by coins, mounting means whereby the counter roller is carried for free rotation about its axis and for bodily motion transversely to its downwardly towards and upwardly away from a defined position in which the counter roller is spaced from said surface by a distance less than the diameter of a coin of predetermined denomination, said counter roller being biased downwardly to be moved upward from said position by passage along said surface of a coin of said denomination, and electrical switch means responsive to movement of said counter roller out of said position for counting each coin that passes the counter roller, said coin dispensing apparatus being characterized by:

(A) said switch means comprising a pair of elements between which there is a slot that opens in a pair of opposite directions and which cooperate to produce an output upon entry into said slot of an actuating member; and (B) an actuating member connected with said mounting means to be moved in one of said opposite directions by upward movement of the counter roller and in the other of said opposite directions by downward movement of the counter roller, said actuating member being arranged to enter said slot upon movement of the counter roller out of said position and to move freely in said slot in said one direction so that the counter roller can be passed by coins substantially larger in diameter than said coin of predetermined denomination.

2. The coin dispensing apparatus of claim 1, further characterized by:

(C) said counter roller having a readily detachable connection with said mounting means so that said counter roller can be replaced by any one of a plurality of counter rollers of different diameters, each intended for cooperation with coins of a different predetermined denomination.

3. The coin dispensing apparatus of claim 2 wherein said rotary disc and said mounting means are supported by a stationary base, further characterized by:

(D) cooperating abutment means on said stationary base and on said mounting means whereby said position of the counter means is defined, one of said abutment means being adjustable up and down.

*4. A coin dispensing apparatus comprising a hopper for holding a supply of coins, a rotary disc in said hopper that is inclined to the horizontal and has coin engaging means on an upper face thereof, said rotary disc being rotated by means of a drive shaft at a center thereof in one direction to carry coins upward from near the bottom of the hopper, a delivery knife near the top of the disc to which coins are delivered by the rotary disc for guidance to a delivery chute and which has a substantially upwardly facing surface that the coins engage edgewise, a counter roller supported retractably at a position opposite to the surface of the knife so as to engage with a peripheral edge of the coin, said coin dispensing apparatus being characterized by:*

*means for rotatably supporting the rotary disc on an inclined supporting plate, the supporting means including a circular race, grooved in the bottom surface of the rotary disc at a peripheral portion of the rotary disc, a plurality of balls arranged in the circular race, a retainer for rotatably retaining the balls in the circular race at positions spaced from each other circumferentially and biasing means on the drive shaft extending through a central opening in the rotary disc toward the supporting plate, thereby maintaining the position of the peripheral portion of the rotary disc at a constant position.*

*5. The coin dispensing apparatus of claim 4, wherein said counter roller includes a readily detachable connection connecting with a mounting means so that said counter roller can be replaced by any one of a plurality of counter rollers of different diameters, each intended for cooperation with coins of a different predetermined denomination.*

*6. The coin dispensing apparatus of claim 5, wherein said rotary disc and said mounting means are supported by a stationary base having abutment means, cooperating with abutment means on said mounting means, whereby said position of the counter means is defined, one of said abutment means being adjustable up and down.*

* * * * *